(No Model.) 4 Sheets—Sheet 1.
J. F. MARTIN.
DISTRIBUTER FOR ELECTRIC WIRES.
No. 286,942. Patented Oct. 16, 1883.
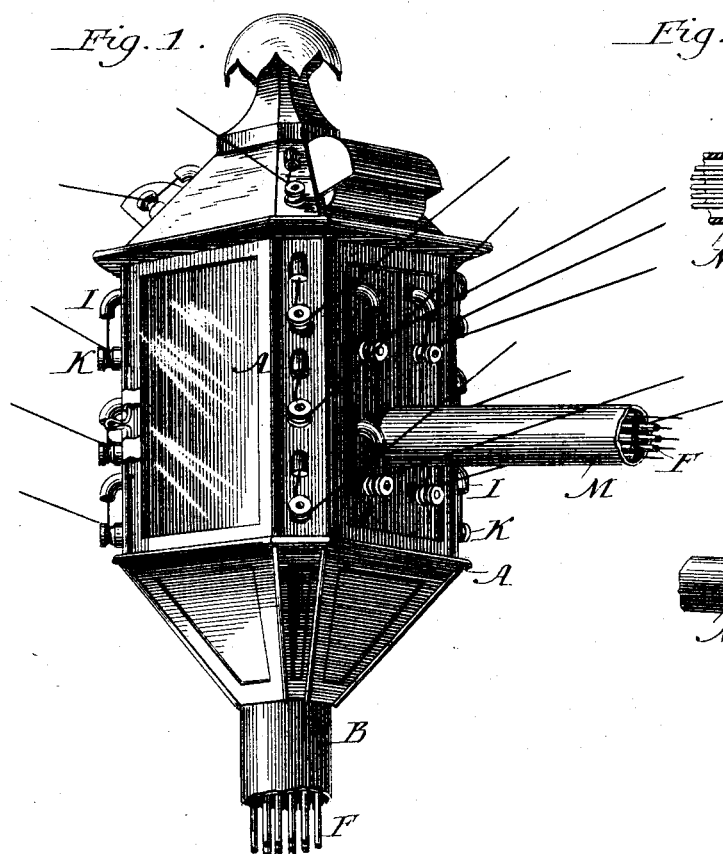
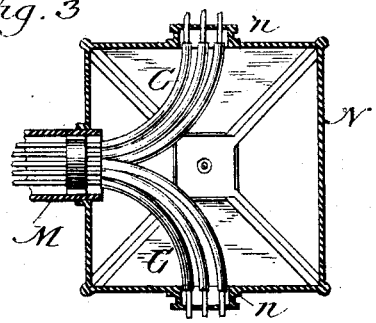
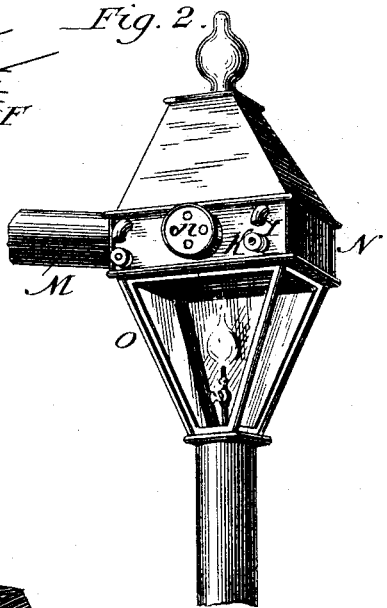
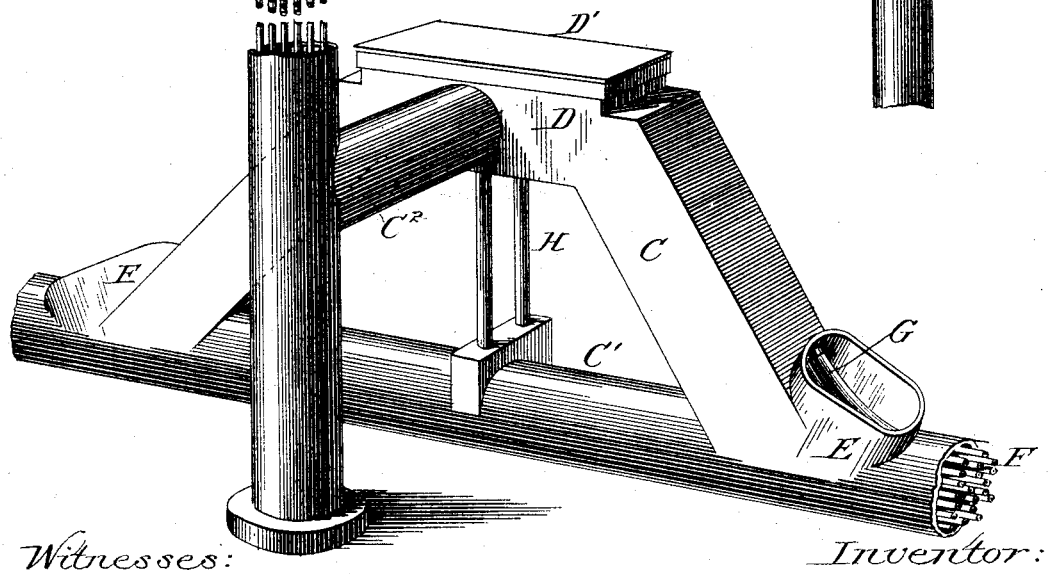
Witnesses:
Frank S. Blanchard.
Will R. Cushman.
Inventor:
John F. Martin
Jno. G. Elliott

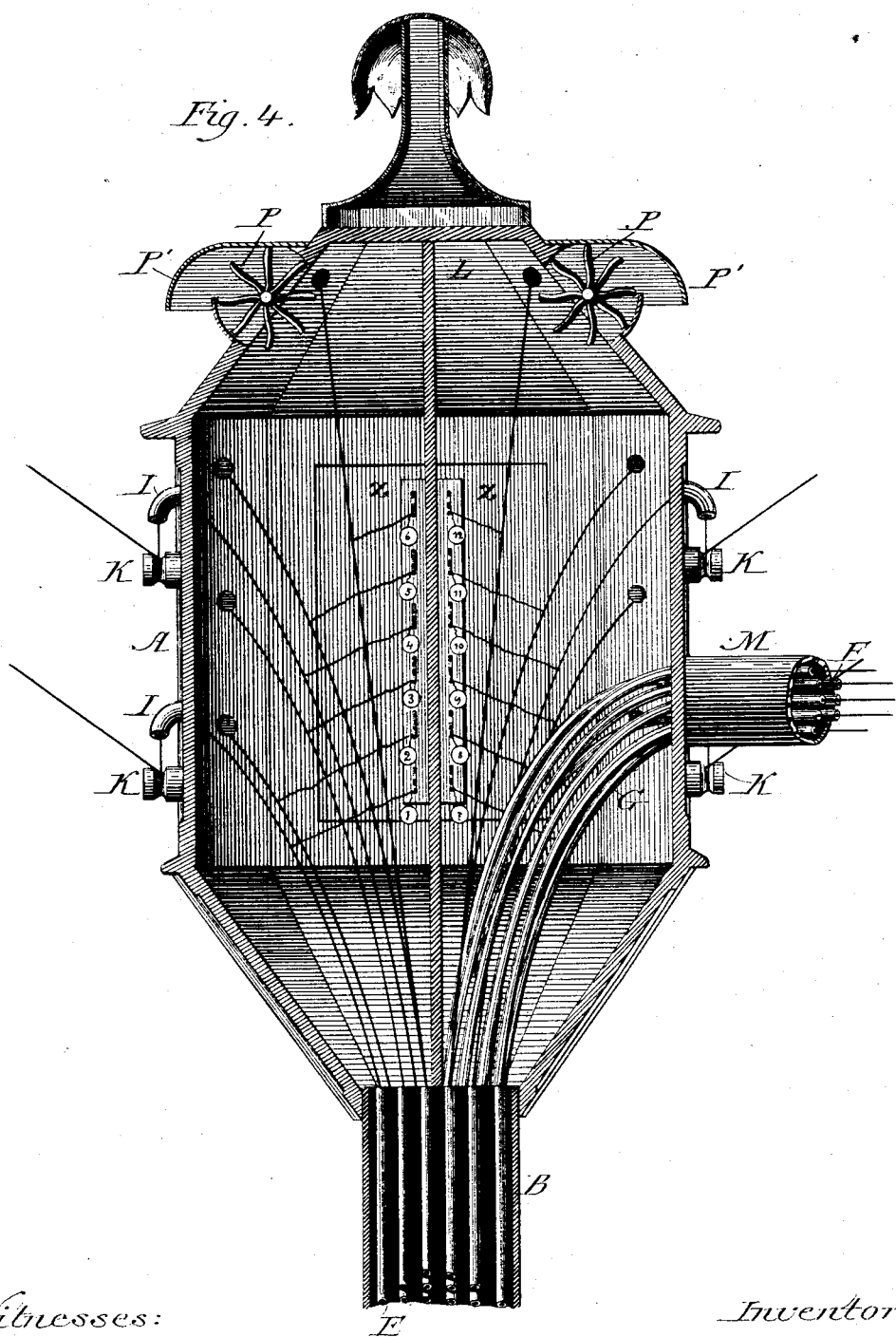

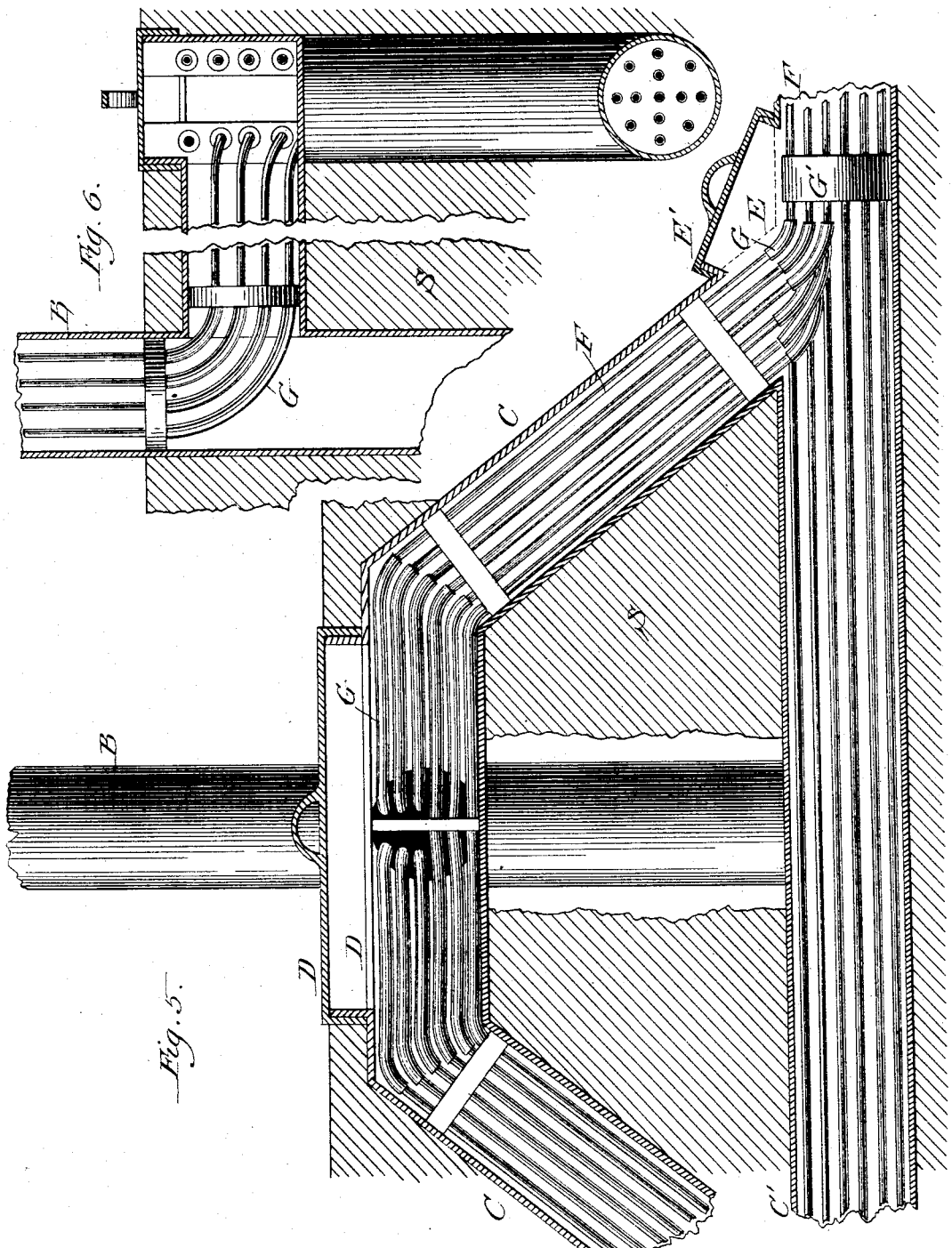

(No Model.) 4 Sheets—Sheet 4.
J. F. MARTIN.
DISTRIBUTER FOR ELECTRIC WIRES.
No. 286,942. Patented Oct. 16, 1883.
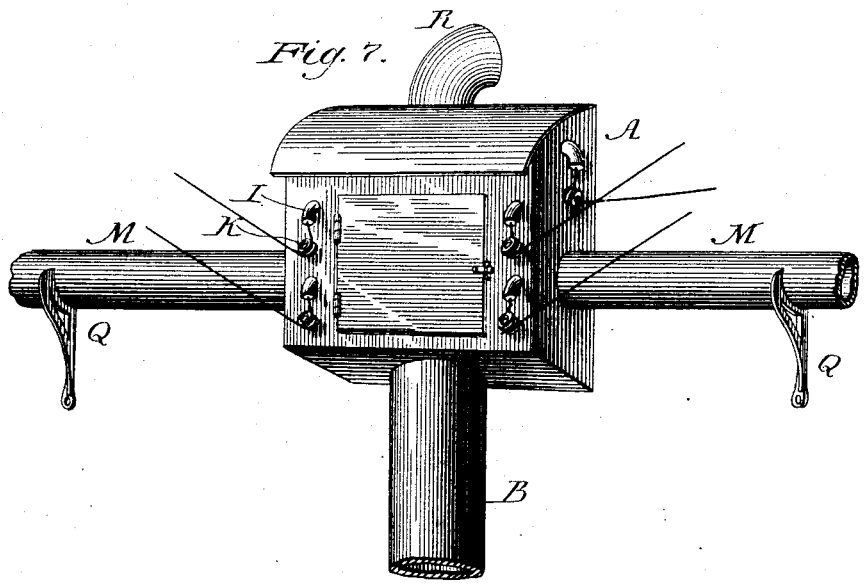
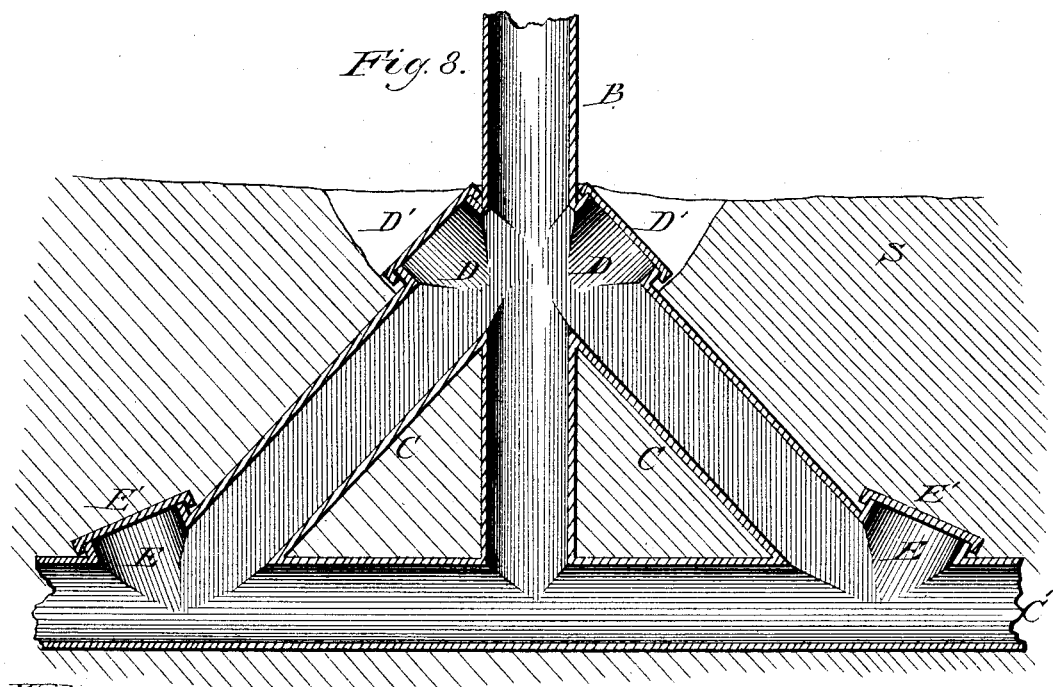
Witnesses: Will R. Onshundro. W. Rossiter.
Inventor John F. Martin By Jno. G. Elliott Atty.

United States Patent Office.

JOHN F. MARTIN, OF CHICAGO, ILLINOIS.

DISTRIBUTER FOR ELECTRIC WIRES.

SPECIFICATION forming part of Letters Patent No. 286,942, dated October 16, 1883.

Application filed March 12, 1883. (No model.)

*To all whom it may concern:*

Be it known that I, JOHN F. MARTIN, a citizen of the United States, residing in Chicago, county of Cook, and State of Illinois, have invented certain new and useful Improvements in Distributers for Electric Wires, of which the following is a specification.

The object of this invention is to provide improved means for conducting electric wires from a conduit laid under ground to a point or points above the surface of the earth, and to provide efficient means for distributing and carrying off the wires from such points to various localities, both directly along the route and adjacent thereto. To such end I provide one or more elevated distributers constructed and connected with an underground conduit, as hereinafter described, and I further provide one or more elevated auxiliary distributers connected with the main distributer, all as hereinafter more fully set forth, and illustrated in the annexed drawings, in which—

Figure 1 is a perspective view of an elevated distributing-box constructed, supported, and connected with an underground conduit in accordance with my invention. Fig. 2 is a perspective view of an auxiliary distributing-box. Fig. 3 is a horizontal section through the same. Fig. 4 represents, on a larger scale, a section taken on a vertical plane through the main distributing-box. Fig. 5 is a section taken on a vertical plane through the conduit and branch pipe which connects the conduit with a hollow support for the distributer-box. Fig. 6 is a vertical section taken on a plane at right angles to Fig. 5. Fig. 7 is a perspective view of a somewhat different form of distributing-box. Fig. 8 represents a vertical section through a somewhat modified construction of pipe-connection between the conduit and the hollow support for the distributing-box.

The letter A indicates an elevated distributing-box for telegraph and other electric wires. This box is supported upon a hollow post, B, which is adapted to be set in the ground in the same way as an ordinary street lamp-post.

A bent branch or switch pipe, C, is connected at its ends with an underground conduit, C', and at or about its highest portion connected with the hollow post by pipe-connection C², as in Fig. 1, so that wires from the main conduit can be conducted up through these pipes to the hollow post, and thence up into the distributing-box. The branch pipe C is also set in the ground, and at the point where it connects with the hollow post it is enlarged, so as to form a drawing-in box, D', which, when fitted upon the box, will be substantially on a level with the street or sidewalk, according to the location of the branch pipe, whereby ready access can be had to said box. Similar boxes or enlargements, E, are also provided at the points where the branch pipe connects with the main conduit-pipe, and said boxes are likewise closed by means of suitable covers, E'.

It is proposed to provide straight insulating-tubes F for the wires, and to connect these tubes, at points where bends occur in the pipes or passages herein shown, by means of flexible coupling-tubes G. The drawing-in boxes are located at these bends, and hence access can be had to the interior of the pipes or passages at such points, so as to allow the wires to be drawn and passed through the straight insulating-tube and the flexible couplings which are provided at such bends. Supports G' will be provided for the insulating-tubes, both in the conduit and connections between the conduit and the distributing-box, and in other places where the insulating-tubes require such supports, these supports being preferably composed of perforated paper disks fitted within the pipes, as described in an application which I have made for Letters Patent of even date herewith.

When the branch pipe C is located alongside of the hollow post and connected therewith by a laterally-arranged pipe-connection, as shown in Fig. 1, said bent branch can be braced by means of rods H, which connect it with the main conduit-pipe.

The distributer-box A is provided with any desired number of short tubes or spouts, I, through which wires running up from the post into the box can be separately conducted to the outside of the latter. These spouts I, which extend out from the distributing-box, are either composed of some insulating material, or some suitable insulator for the wires is placed in each spout, so as to insulate the wires at the points where they pass through the walls of the box. The spouts are bent downwardly, so as to prevent rain or snow from entering the box, and a knob, K, of some insulating material, is secured upon the distributing-box contiguous to each one of the spouts I. Where wires are to be carried separately to buildings or other points along the route or street under which the conduit is laid, the wires are passed from the box out through the bent spouts, and carried around or secured to the insulators K, after which they can be carried off to their several points of destination.

In order to separate different kinds of wires from each other—as, for example, telephone or telegraph wires from wires used in electric lighting—I divide the interior of the distributing-box into two compartments by means of a vertical partition, L; or, if necessary, more than one of these partitions can be provided, so as to divide the box into more than two compartments. I further provide the box with a door or doors, l, in order that access can be had to its interior for the purpose of drawing the wires up from the tubes in the post and passing them out through the sides of the box, and also so that the wires can be taken out or inspected, as may be required.

The connections made by the wires can be ascertained by numbering them in any suitable way—as, for example, by attaching numbered tags to cords or strips of some insulating material, which are attached to the wires or insulating-tubes, and also connected with hooks or other attachments secured to any suitable support within the distributing-box. Elevated distributing-boxes of this character can be located at any desired points along the route, and hence wires can be distributed from the box and carried separately to houses along the street or road in the manner just described. Where, however, it is desired to conduct a number of wires from the distributing-box through a cross-street or alley-way, and especially the latter, I provide one or more auxiliary distributing-boxes such as shown in Figs. 2 and 3. The auxiliary distributing-box is connected with the main distributing-box by a pipe, M, through which insulating-tubes for the wires can pass. These tubes can be coupled with a like number of tubes within the hollow post for the main distributer by means of flexible connecting-tubes G, which are shown in Fig. 1. When the main distributing-box is located near the entrance of an alley-way, an auxiliary distributing-box, N, will be located in some suitable position in the alley, so that wires which are brought from the main distributing-box to the auxiliary distributing-box can be distributed from the latter to the rear of any or all of the houses along the alley. In this way wires from a conduit running along one street can be conducted to a distributer in the same street, and from thence be carried to every house in the square, at one side of which the said main distributer is located.

The auxiliary distributer can be provided with bent spouts I and insulators K in the same way and for the same purpose as those employed for the main distributing-box. The auxiliary distributing-box can be further provided with one or more short pipe-sections, n, closed at their ends by a perforated cap of some insulating material, and as many of the wires as may be desired passed through the same; or perforated caps of some insulating material, or short pipes containing perforated insulating-disks, can be employed for a like purpose. These insulating-distributers can be mounted in any suitable way upon posts or standards, or, as shown in Fig. 2, the distributing-box can be placed upon a street-lamp, O, the box preferably taking the place of the upper portion of the usual frame or casing. In general, one auxiliary distributing-box will be found sufficient for a single main distributing-box, although on some occasions two or more auxiliary distributers connected with each other by pipes could be provided.

In the upper portion of the main elevated distributing-box I provide openings, in which rotary exhaust-fans P are arranged, for the purpose of inducing a current of air from the conduit up through the distributing-box and connections between the same and the conduit, in order to keep the insulating-tubes and wires dry. The fans are protected by sheds or covers P', arranged at the top of the box, as indicated.

In Fig. 7 I have shown the elevated distributing-box A adapted to be placed alongside the wall of a building. The box in this instance will be provided with the bent spouts or tubes I, and the insulators K, and a door, l, substantially as in Fig. 1, and will be supported by a hollow pipe or post, B, which can be also connected in substantially the same way with the underground conduit, it being observed that the branch pipe C can be bent to suit the relative positions of the parts. The pipe M in Fig. 7, which is supported upon brackets Q, that can be secured to the wall, is adapted to conduct certain wires from the box to auxiliary distributing-boxes, or means for distributing the wires at required points; and in addition to or in lieu of fans, I can provide the distributing-box with an upper pipe, R, which may be carried through the wall of the building and connected with the chimney-flue, whereby a draft will be created through the distributing-box and its connecting-pipes. In Fig. 8 I have shown another way in which the hollow post for the main distributing-box can be supported and connected with the conduit. In this instance the post rises from the conduit, which affords a base support for the post, and the branch C from the conduit is formed by inclined pipe-sections, which connect the hollow post with the conduit. The drawing-in boxes at the junction of said pipes with the conduits are formed in substantially the same way as in the preceding illustrations, and the drawing-in box as in Figs. 1 and 5, for facilitating the operation of carrying wires from the branch to the hollow post, is formed by enlarging the upper ends of the inclined pipes at the points where they connect with the hollow post, and providing, by preference, two covers, D', in lieu of one. In this last-described figure, as well as in Figs. 5 and 6, the earth is indicated by the letter S, and the hollow post and the conduit with the pipe connection between the two are shown set in position under ground.

A convenient way of arranging the distributing-boxes along the main streets of a city where police alarm-boxes are used will be to support the distributing-box above the police alarm-box.

Having thus fully described my invention, what I claim, and desire to secure by Letters Patent, is—

1. The combination, with an elevated distributing-box mounted upon a hollow support, of a branch pipe leading from a conduit for the wires and connected with the hollow support, said branch pipe being provided with one or more drawing-in boxes, substantially as and for the purpose described.

2. The distributing-box for electric wires, mounted upon a hollow support, and provided with projecting tubes and insulators as a means for conducting the wires from the box, substantially as specified.

3. The elevated distributing-box for electric wires, mounted upon a hollow support, and provided with outlets for the wires, a partition for separating different kinds of wires, and a door whereby access can be had to the interior of the box, substantially as specified.

4. The elevated distributing-box for electric wires, mounted upon a hollow support through which the wires are carried from a conduit up into the box, said box being provided with means, substantially as described, for inducing air-currents from the conduit through the hollow support and through the interior of the box, for the purpose of keeping the insulated wires dry.

5. The combination, with the hollow support of an elevated distributer for electric wires, of the bent branch C, connected with an underground conduit, and provided with the drawing-in boxes, which are provided with removable covers, and located at the connection between the branch pipe and the conduit and at the point where connection is made between the branch pipes and the hollow support, substantially as described.

6. The combination, with a main elevated distributing-box for electric wires, which is connected with an underground conduit, of an auxiliary distributing-box connected by pipe-connection with said main distributing-box, substantially as described.

7. An elevated distributing-box for electric wires, mounted upon a pipe which extends down and is connected with an underground conduit, in combination with a pipe branching out from the elevated distributing-box, and brackets secured in an elevated position and adapted to support said branch pipe, substantially as described.

JOHN F. MARTIN.

Witnesses:
W. W. ELLIOTT,
JNO. G. ELLIOTT.